US011835143B2

United States Patent
Tütek

(10) Patent No.: US 11,835,143 B2
(45) Date of Patent: Dec. 5, 2023

(54) FILLING VALVE

(71) Applicant: SERDAR PLASTIK SANAYI VE TICARET ANONIM ŞIRKETI, Ankara (TR)

(72) Inventor: Serdar Mustafa Tütek, Ankara (TR)

(73) Assignee: SERDAR PLASTIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 17/606,760

(22) PCT Filed: May 5, 2020

(86) PCT No.: PCT/TR2020/050383
§ 371 (c)(1),
(2) Date: Oct. 27, 2021

(87) PCT Pub. No.: WO2020/226592
PCT Pub. Date: Nov. 12, 2020

(65) Prior Publication Data
US 2022/0213961 A1    Jul. 7, 2022

(30) Foreign Application Priority Data
May 7, 2019 (TR) .................. 2019/06805

(51) Int. Cl.
*F16K 1/04* (2006.01)
*F16K 31/60* (2006.01)

(52) U.S. Cl.
CPC ............. *F16K 1/04* (2013.01); *F16K 31/60* (2013.01)

(58) Field of Classification Search
CPC . F16K 1/04; F16K 1/482; F16K 1/487; F16K 31/50; F16K 31/60
See application file for complete search history.

(56) References Cited

U.S. PATENT DOCUMENTS

| 4,230,301 | A | * | 10/1980 | Miller | F16K 1/04 251/367 |
| 4,231,440 | A | * | 11/1980 | Erwin | F16K 5/0442 137/246.22 |
| 5,141,027 | A | * | 8/1992 | Magnasco | F16K 1/52 137/614.17 |
| 6,065,735 | A | * | 5/2000 | Clark | F01L 13/0005 251/293 |
| 8,382,621 | B2 | * | 2/2013 | Chen | G05G 1/08 475/4 |

* cited by examiner

*Primary Examiner* — Hailey K. Do

(57) ABSTRACT

The present invention relates to a welding-free valve that controls the passages of fluids such as gas, air, water, steam and oil in combi boilers and the similar devices, that is designed to ensure the flow rate, that is manufactured from a plastic material and that is resistant to high temperatures, chemicals, and pressure. The valve comprised of nail components is characterized by becoming a single piece, such that components constituting the device itself are fitted together and nails are placed, so that the assembly is completed.

1 Claim, 6 Drawing Sheets

FILLING VALVE

The present invention relates to a jointless and welding-free valve that controls the passages of fluids such as gas, air, water, steam and oil in combi boilers and the similar devices, that is designed to ensure the flow, that is manufactured from a plastic material and that is resistant to high temperatures, chemicals, and pressure.

Said valve is of a compact size that is positioned between pipes in combi boilers and similar devices and controls the flow of coming fluids through a certain pressure. It regulates the transfer speed by controlling turbulent flow conditions in the water. It relates to a device that is embodied in the pipe, that adjusts and stops the flow of a fluid being transferred through the pipe and initiates the stopping of flow or increases and decreases the flow rate of the fluid.

TECHNICAL FIELD OF THE INVENTION

The present invention is a component that controls the passage of fluids such as gas, air, water, steam, and oil and ensures to control the flow in combi boilers and similar devices. Said valve is an inlet and outlet member that opens and closes depending on the condition in the installations with fluids. They are safety apparatus that decreases the pressure by discharging the fluid out of the system in case of pressure increase in systems, in which the fluid pressure constitutes importance or that protects the device by controlling the coming high-pressure fluid in the device and that cuts off the fluid communication in case of emergency. It is also employed to isolate the pressure difference caused by the fluid in a pipe from the pressure caused by the fluid in another pipe in the same system.

STATE OF THE ART

Metal valve systems used in the combi boilers and similar devices cause corrosion over time, thereby leading to a hard-to-control. Furthermore, their main object is to control the turbulent flow conditions in the water and thus to regulate the fluid transfer. The body comprises the fluid passage system and moving elements, in which the opening and closing are performed, encompasses and guides the fluid, allows for joining with pipes, shows resistance to the pressure, and protects safely the device and medium from fluids by means of its tightness.

BRIEF DESCRIPTION OF THE INVENTION

The present invention relates to a welding-free valve that controls the passages of fluids such as gas, air, water, steam and oil in combi boilers and the similar devices, that is designed to ensure the flow rate, that is manufactured from a plastic material and that is resistant to high temperatures, chemicals, and pressure. The valve comprised of nail components is characterized by becoming a single piece, such that components constituting the device itself are fitted together and nails are placed, so that the assembly is completed.

DETAILED DESCRIPTION OF THE INVENTION

The present invention relates to a jointless and welding-free valve that controls the passages of fluids such as gas, air, water, steam and oil in combi boilers and the similar devices, that is designed to ensure the flow rate, that is manufactured from a plastic material and that is resistant to high temperatures, chemicals, and pressure. It is a valve comprised of two components, excluding the sealing elements.

REFERENCES NUMERALS

Figure 1:
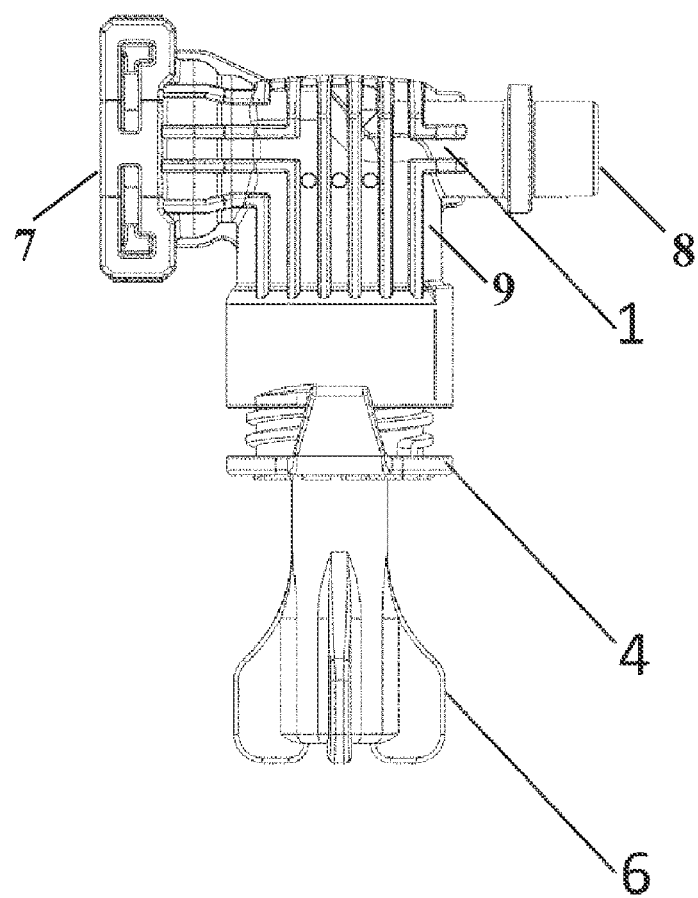
FIG. 1—DV front view
FIG. 2—DV left view
FIG. 3—DV right view
FIG. 4—DV bottom view
FIG. 5—DV top view
FIG. 6—DV sectional view
FIG. 7—DV exploded top view
Figure 2:
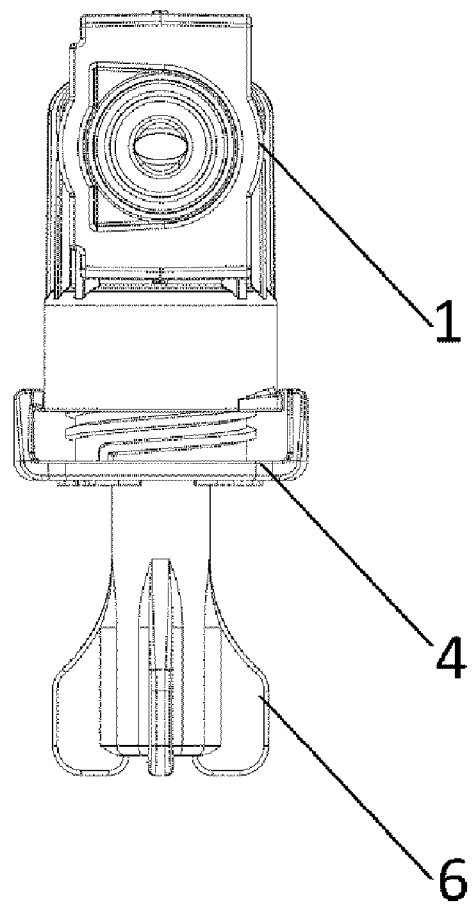
Figure 3:
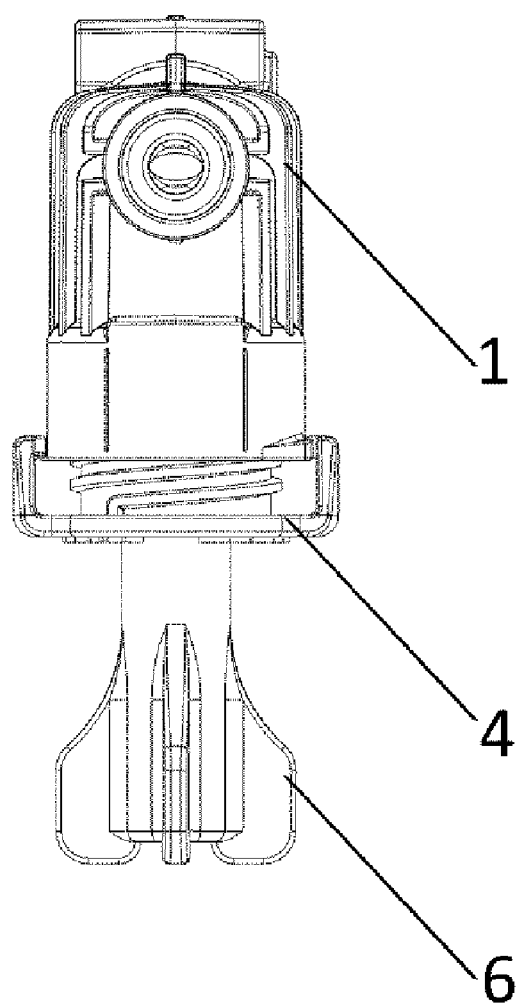
Figure 4:
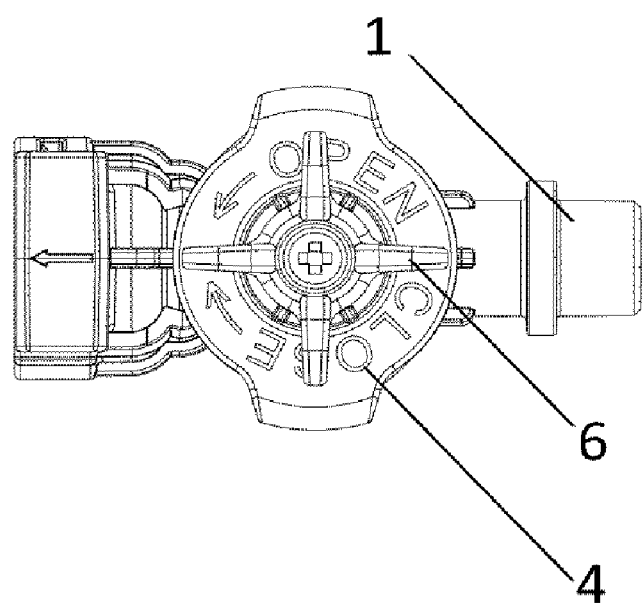
Figure 5:
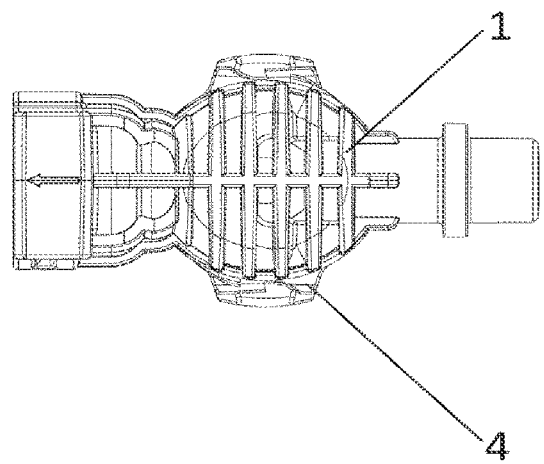
Figure 6:
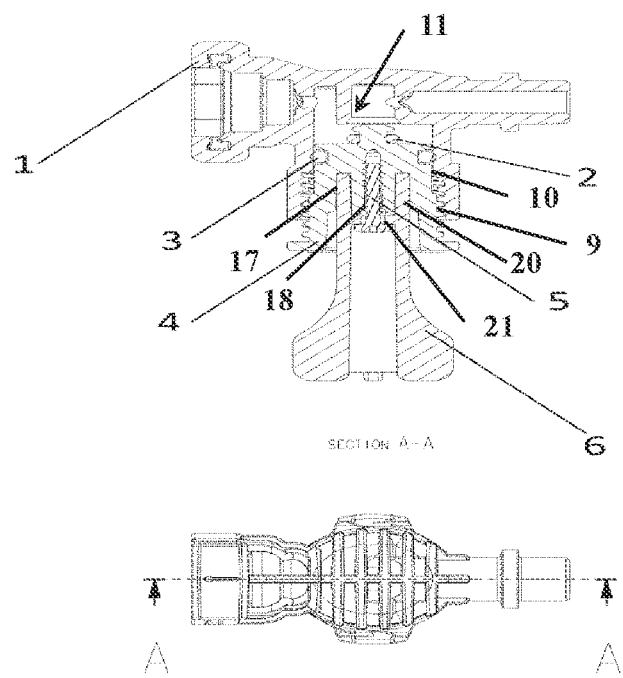
Figure 7:
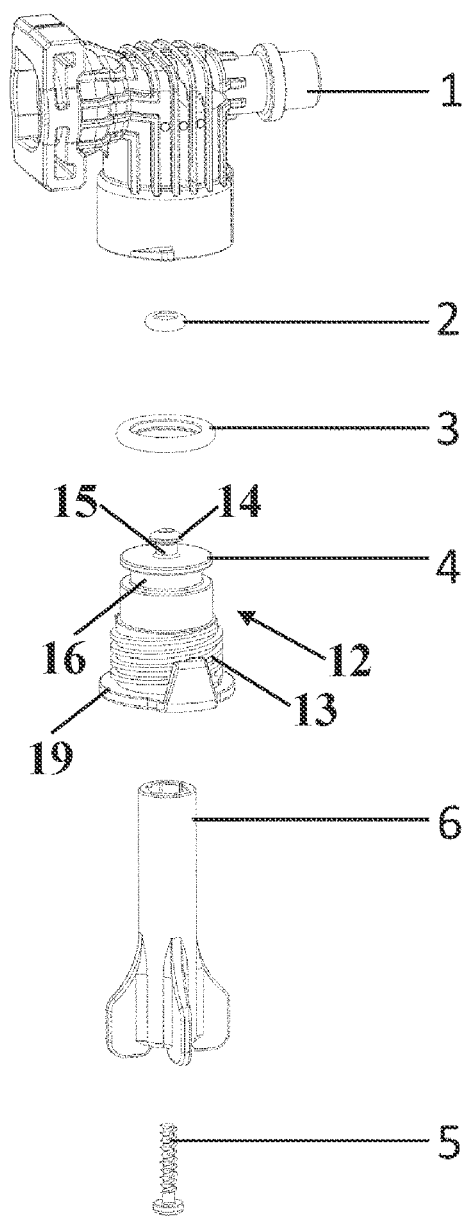

Body 1
First O-ring gasket 2
Second O-ring gasket 3
Movable Plug 4
Bolt 5
Handle 6, a first open end 7, a second open end 8, a first cylindrical bore 9, a first threaded portion 10, a first tapered profile 11, a cylindrical portion 12, a second threaded portion 13, a second tapered profile 14, a first groove 15, a second groove 16, an internal cylindrical groove 17, a threaded hole 18, a lateral projection 19, a first cylindrical extension 20 and a hole 21.

The present invention is a fluid flow control valve comprised of two main components, namely body (1) and movable, plug (4), which is sealed by means of elements, known as two O-ring (2,3) sealing elements. The body (1) constitutes a cover function for the fluid flow control valve and a bearing for the opening-closing handle (6). Opening-closing handle (6) transfers the opening-closing force and movement applied externally on the fluid flow control valve to the movable plug (4) being the opening-closing member. O-rings provide tightness between moving and fixed components. Bolt (5) provides the connection between the handle (6) and the movable plug (4) and the handle (6) is demounted by disassembling the bolt (5) on demand. In case the fluid flow control valve can be controlled manually in the device, the fluid flow control valve may be opened and closed by means of the movable plug (4) thereon without requiring the handle (6).

The valve comprised of nail components is characterized by becoming a single piece, such that components constituting the device itself are fitted together and nails are placed, so that the assembly is completed.

In an embodiment, body 1 of the fluid flow control valve comprises a first open end 7 and a second open end 8. A fluid flow path is defined between the first open end 7 and the second open end 8. The body 1 comprises a first cylindrical bore 9 having a first central longitudinal axis. A portion of an inside surface of the first cylindrical bore 9 defines a first threaded portion 10. The body 1 further defines a first tapered profile 11 defined in the fluid flow path. The first tapered profile 11 is concentric to the first longitudinal axis.

In an embodiment, the movable plug 4 comprises a cylindrical portion 12. The cylindrical portion 12 comprises an external surface. The cylindrical portion 12 is concentric to the first cylindrical bore 9. A portion of the cylindrical portion 12 defines a second threaded portion 13. The second threaded portion 13 is configured to engage with the first threaded portion 10. A second tapered profile 14 extends from the cylindrical portion 12. The second tapered profile 14 is complementary to the first tapered profile 11. The movable plug 4 further comprises a first groove 15 that is defined between the cylindrical portion 12 and the second tapered profile 14. A second groove 16 is defined on the cylindrical portion 12. An internal cylindrical groove 17 extends along the first central longitudinal axis. The movable plug 4 further comprises a threaded hole 18 that is defined within the confines of the internal cylindrical groove 17. The threaded hole 18 is concentric to the first central longitudinal axis. A lateral projection 19 extends from the cylindrical portion 12 of the movable plug 4. The lateral projection 19 is provided on the opposite side of the second tapered profile 14.

In an embodiment, the first O-ring gasket 2 is configured to be received in the first groove 15. The second O-ring gasket 3 is configured to be received in the second groove 16.

In an embodiment, a portion of the handle 6 of the fluid flow control valve extends out of the movable plug 4, away from the second tapered profile 14 along the first central longitudinal axis. The handle 6 comprises a first cylindrical extension 20 that is configured to be received by the internal cylindrical groove 17 of the movable plug 7. Further, the handle 6 comprises a hole 21 that is concentric to the threaded hole 18 of the movable plug 4.

In an embodiment, the bolt 5 is configured to provide a connection between the handle 6 and the movable plug 4. The bolt 5 is configured to pass through the hole 21 of the handle 6 and engages with the threaded hole 18 of the movable plug 4, such that the engagement restricts the movement of the handle 6 relative to the movable plug 4.

In order to provide the necessary pressure to operate a system, the valve is activated by means of the handle (6) and the fluid passage is allowed and when the necessary pressure is provided, the valve is closed through the same handle (6), thereby keeping the pressure in the system. The handle (6) is characterized to allow for the external control of the device outside the device according to the position of the valve in the system. If the valve is in a position such that it cannot be reached or controlled manually, the valve may be controlled through the handle (6) mounted on its body (1) by means of the bolt (5). In case the valve is in a reachable position in devices, opening and closing functions thereof may be performed through the plug (4) without requiring the handle (6) and bolt (5).

In an embodiment, the movable plug 4 is configured to rotate about the first central longitudinal axis relative to the body 1 by interfacing between the first threaded portion 10 and the second threaded portion 13. The instant rotation causes the movable plug 4 to move linearly along the first central longitudinal axis.

In an embodiment, when the movable plug 4 rotates in a first rotation direction, the movable plug 4 advances towards the first tapered profile 11 which causes the second tapered profile 14 and the first O-ring gasket 2 to interface with the first tapered profile 11, thereby blocking the fluid flow path defined between the first open end 7 and the second open end 8.

In an embodiment, when the movable plug 4 rotates in a second rotation direction, the movable plug 4 advances away from the first tapered profile 11 which causes the second tapered profile 14 and the first O-ring gasket 2 to move away from the first tapered profile 11, thereby unblocking the fluid flow path defined between the first open end 7 and the second open end 8.

In an embodiment, the rotation of the movable plug 4 results from a force that is applied directly to the lateral projection 19 that extends from the cylindrical body 1, when the handle 6 is disengaged from the movable plug 4.

In an embodiment, the rotation of the movable plug 4 results from a force that is applied directly to the handle 6, when the handle 6 is engaged to the movable plug 4.

What is claimed is:
1. A fluid flow control valve configured for use in a fluid flow system, the fluid flow control valve comprising:
  a body defining:
    a first open end;
    a second open end;
    a fluid flow path defined between the first open end and the second open end;
    a first cylindrical bore having a first central longitudinal axis, wherein at least a portion of an inside surface of the first cylindrical bore defines a first threaded portion; and
    a first tapered profile defined in the fluid flow path, the first tapered profile being concentric to the first central longitudinal axis;
  a movable plug comprising:
    a cylindrical portion comprising an external surface, the cylindrical portion being concentric to the first cylindrical bore, wherein at least a portion of the cylindrical portion defines a second threaded portion, wherein the second threaded portion engages with the first threaded portion;
    a second tapered profile extending from the cylindrical portion, the second tapered profile being complementary to the first tapered profile;
    a first groove defined between the cylindrical portion and the second tapered profile;
    a second groove defined on the cylindrical portion;
    an internal cylindrical groove extending along the first central longitudinal axis;
    a threaded hole defined within the confines of the internal cylindrical groove, the threaded hole being concentric to the first central longitudinal axis; and
    a lateral projection extending from the cylindrical body, the lateral projection provided on opposite side of the second tapered profile;
  a first O-ring gasket received in the first groove;
  a second O-ring gasket received in the second groove;
  a handle, wherein at least a portion of the handle extends out of the movable plug, away from the second tapered profile, along the first central longitudinal axis, the handle comprising:
    a first cylindrical extension received by the internal cylindrical groove of the movable plug; and
    a hole concentric to the threaded hole of the movable plug; and
  a bolt that provides a connection between the handle and the movable plug, the bolt passing through the hole of the handle and engaging with the threaded hole of the movable plug, wherein the engagement restricts movement of the handle relative to the movable plug;
  wherein:
    rotation of the movable plug, about the first central longitudinal axis, relative to the body, by interfacing between the first threaded portion and the second threaded portion, causes the movable plug to move linearly along the first central longitudinal axis;
    the rotation of the movable plug in a first rotation direction causes the movable plug to advance towards the first tapered profile, causing the second tapered profile and the first O-ring gasket to interface with the first tapered profile, and block the fluid flow path defined between the first open end and the second open end;

the rotation of the movable plug in a second rotation direction causes the movable plug to advance away from the first tapered profile, causing the second tapered profile and the first O-ring gasket to move away from the first tapered profile, and unblock the fluid flow path defined between the first open end and the second open end;

the rotation of the movable plug results from force being applied directly to the lateral projection extending from the cylindrical portion, when the handle is disengaged from the movable plug; and the rotation of the movable plug results from force being applied directly to the handle, when the handle is engaged to the movable plug.

* * * * *